Patented July 11, 1950

2,514,928

UNITED STATES PATENT OFFICE 2,514,928

POLYMERIZING BRANCH-CHAIN HEXADIENES

Eugene T. Bishop and Robert D. Sullivan, Berkeley, Calif., assignors to Shell Development Company, San Francisco, Calif., a corporation of Delaware No Drawing. Application April 30, 1945, Serial No. 591,220

10 Claims. (Cl. 260—82.1)

This invention relates to the polymerization of unsaturated hydrocarbons comprising hexadienes and relates more particularly to the polymerization of branch-chain 1,3-hexadienes in the presence of organic hydroperoxides and to the polymers thereby produced.

Processes utilized heretofore enabling the large scale production of synthetic elastomers from diene hydrocarbons are generally limited to the utilization of butadiene as starting material. In these processes the butadiene is generally polymerized alone or in admixture with another compound, such as, for example, styrene or acrylonitrile. Though processes are now available producing valuable synthetic elastomers from these materials, such processes are nevertheless handicapped by serious disadvantages. The efficient utilization, in the production of synthetic elastomers or synthetic rubbers, of dienes more readily available than butadiene and which are capable of being produced with a lesser number of operative steps substantially free of the hazards encountered in the production of butadiene, has long been sought after. Attempts to polymerize the hexadienes, particularly the branched 1,3-hexadienes, which are readily produced in the substantial absence of these difficulties, in these processes have generally been unsuccessful.

Catalysts such as potassium persulfate, sodium perborate, hydrogen peroxide, and other persulfates, peroxides, perborates, etc. successfully employed in the polymerization of butadiene in these processes necessitate the use of a relatively low temperature which generally must not exceed about 65° C. At higher temperatures these compounds undergo substantial decomposition rendering the process inoperative or resulting in the production of a product unsuited as a commercially desirable synthetic elastomer. In this low temperature range, necessitated by the use of these catalysts, the rate of polymerization of the branched hexadienes is so slow as to render the process economically unfeasible. Attempts to polymerize the branched hexadienes above this temperature range generally do not enable the attainment of practical yields and also result in substantial decomposition of the catalysts rendering difficult, if not impossible, the obtaining of a product having the characteristics of a synthetic elastomer or synthetic rubber of practical value.

A further disadvantage in the processes utilized heretofore resides in objectional features of the catalysts often employed therein. Thus the peroxides, more readily available commercially, such as hydrogen peroxide and benzoyl peroxide, have a tendency to become irritating to the skin. The resultant product obtained therewith, consequently is unsuited in many of the applications in which it otherwise could be employed. Thus, benzoyl peroxide, for example, is generally considered unsuited for incorporation in packaging materials intended to enclose such items as foods or other products destined to come into direct contact with the human body. A still further disadvantage of the peroxide catalysts, particularly benzoyl peroxide, resides in the precautions which must be resorted to in handling them in even relatively pure state, as they are often subject to explosion as a result of friction or drag. Because of their ready decomposition, the resulting oxygen laden atmosphere produced is often the cause of the need for an additional inordinate degree of precautions in their use.

Methyl pentadiene, it has recently been found, can be utilized to a limited degree by copolymerization in admixture with a predominant amount of butadiene or other monomers. Such methods, however, still do not enable the complete elimination of butadiene in the production of elastomers of certain types, nor does it eliminate the serious disadvantages inherent in the use of the more common catalysts employed heretofore.

Recently it has been found, as disclosed and claimed in copending application, Serial No. 514,575, filed December 16, 1943, now abandoned, that the hexadienes, comprising the methyl pentadienes, can be polymerized at higher temperatures by resorting to the use of catalysts such as diazoamino benzene. This has enabled large scale production of valuable elastomers from a charge consisting solely or predominantly of methylpentadienes. This process, however, does not enable the production of a substantially colorless product. Moreover, the resulting product, due to the nature of the catalyst, still renders the product unsuited for incorporation in packaging materials which must be completely non-toxic. A further disadvantage of the use of this type of catalyst resides in the disadvantageous effect upon the product obtained, of variations beyond a well defined limit of the hydrogen ion concentration in the reaction mixtures subjected to the polymerization conditions.

It is an object of the present invention to provide an improved process for the more efficient production of synthetic elastomers, or synthetic rubbers, from monomeric materials comprising hexadienes in which the above difficulties are obviated to at least a substantial degree.

A more particular object of the invention is the provision of an improved process for the more efficient production of synthetic elastomers, or synthetic rubbers, which are light in color from polymerizable monomeric materials comprising branched 1,3-hexadienes, and the synthetic elastomers thereby produced.

Another object of the invention is the provision of an improved process for the more efficient production of non-toxic, synthetic elastomers, or synthetic rubbers, particularly suitable for incorporation in packaging materials intended for the wrapping of foods and other materials subjected to intimate contact with the human body, and the synthetic elastomers thereby produced.

The objects of the present invention are attained by the polymerization of the polymerizable monomeric materials comprising a branch-chain hexadiene under well defined conditions with the aid of an organic hydroperoxide, preferably a tertiary organic hydroperoxide, as catalyst. Utilization of an organic hydroperoxide as catalyst in the process of the invention not only enables the efficient polymerization of the readily available polymerizable monomeric materials consisting predominantly or solely of hexadiene, for example, one or more branch-chain 1,3-hexadienes with high yields in the absence of many of the disadvantages inherent in synthetic elastomer producing processes utilized heretofore, but enables the conversion of these materials into high quality synthetic elastomers or synthetic rubbers which are not only light in color but non-toxic.

The catalysts employed in the execution of the process of the invention comprise broadly the organic hydroperoxides represented by the general formula R—O—O—H wherein R represents an alykl, aryl, aralkyl, alkanyl, alicyclic or heterocyclic radical which may or may not be further substituted. Hydroperoxides employed as catalysts in the process of the invention include those more specifically defined by the general formula R—O—O—H, wherein R is the radical R of an alcohol R—OH. By the term alcohol it is intended to include broadly the primary, secondary and tertiary alcohols, which compounds may contain one or more hydroxyl groups. Included within the scope of the suitable organic hydroperoxide catalysts are the hydroperoxides obtained by treating the corresponding alcohols with hydrogen peroxide in the presence of a suitable dehydrating agent. Alcohols which may thus be treated to obtain the hydroperoxides comprise, for example, ethanol, isopropanol, tertiary butyl alcohol, tertiary amyl alcohol, secondary butyl alcohol, monomethyl ether of ethylene glycol, monoethyl ether of ethylene glycol, propylene glycol, diethylene glycol, benzyl alcohol, cyclohexanol, cineol, 4-methyl cyclohexanol, tetrahydrofurfuryl alcohol, and the like. The suitable hydroperoxides are also produced by reacting neutral dialkyl sulfate with an alkali peroxide or with hydrogen peroxide in the presence of an alkali.

Of the above-defined catalysts the tertiary organic hydroperoxides represented by the general formula R—O—O—H, wherein R is an organic radical which contains a tertiary carbon atom directly attached to the hydroperoxy (—O—O—H) radical are preferred. Such preferred tertiary organic compounds are suitably represented by the general formula

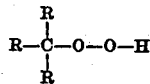

wherein each R represents a like or different alkyl, aryl, aralkyl, alkanyl, alicyclic or heterocyclic radical which may or may not be further substituted. Suitable substituted tertiary organic hydroperoxides comprise the halo-substituted organic tertiary hydroperoxides.

The tertiary alkyl hydroperoxides and substituted tertiary alkyl hydroperoxides are particularly preferred. Such particularly preferred catalysts comprise, for example, tertiary butyl hydroperoxide, tertiary amyl hydroperoxide, their homologues and the substitution products thereof, the monohalo-substituted tertiary alkyl hydroperoxides such as chlorotertiary butyl hydroperoxide, chlorotertiary amyl hydroperoxide, and their homologues.

The tertiary organic hydroperoxides may be prepared by the slow, controlled oxidation of the corresponding organic compound containing at least one tertiary carbon atom of aliphatic character as described and claimed in copending application, Serial No. 510,421, filed November 15, 1943, now U. S. Patent 2,403,772. The following is a non-limiting representative list of saturated aliphatic hydrocarbons (containing at least one tertiary carbon atom) which are thus converted to the corresponding tertiary hydroperoxide: isobutane, 2-methyl butane, 2-ethyl butane, 2-methyl pentane, 3-methyl pentane, 2,3-dimethyl butane, and their homologues, as well as their halogenated derivatives in which the halogen atom or atoms are attached to the primary or secondary carbon atoms so that the tertiary carbon atom or atoms contain a replaceable hydrogen atom. The following are examples of such halogenated derivatives: 1-halo-2-methyl propane, 1-halo-2-ethyl propane, 1-halo-2-methyl butane, 1-halo-3-methyl butane, and the like, and their homologues. Also, one or more of the aliphatic radicals attached to the tertiary carbon atom may be substituted by an aryl or aralkyl radical. As examples of such compounds reference may be made to isopropyl benzene, 1-phenyl-1-methyl propane, 1-phenyl-2-methyl propane, and the like. It is to be understood, however, that the invention is in no wise limited by the method of preparation or origin of the organic hydroperoxide employed as catalyst.

Hexadienes charged to the process of the invention, particularly suited to the attainment of highly valuable synthetic elastomers or synthetic rubbers, comprise the branch-chain, 1,3-hexadienes having a straight chain of five carbon atoms. A process enabling the production of valuable synthetic elastomers from 2-methyl-1,3-pentadiene and 4-methyl-1,3-pentadiene is particularly advantageous because of the ready availability of these hexadienes which are easily produced. According to one process of their production, acetone is first condensed to form diacetone alcohol, which is then converted to 2-methyl-2,4-pentanediol by hydrogenation, dehydration of the diol yielding the desired hexadienes. In accordance with the present invention 2-methyl-1,3-pentadiene and 4-methyl-1,3-pentadiene can be polymerized alone or in admixture with one another. It is preferred to employ a charge comprising a mixture of 2-methyl-1,3-pentadiene and 4-methyl-1,3-pentadiene. Utilization of a mixture comprising about 85% of 2-methyl-1,3-pentadiene with about 15% of 4-methyl-1,3-pentadiene, such as may be produced by the dehydration of 2-methyl-2,4-pentanediol is particularly preferred.

Although a particular advantage of the invention resides in the ability to produce valuable elastomers efficiently from a charge consisting essentially only of the branch-chain hexadienes, the invention contemplates the polymerization of mixtures comprising in addition to the hexadiene, for example, the 2-methyl-1,3-pentadiene or the 4-methyl-1,3-pentadiene, or a mixture of both, relatively lesser amounts of other polymerizable unsaturated compounds. One group of compounds which can be used in the production of co-polymers with the methylpentadienes consists of other polymerizable conjugated aliphatic dienes, such as conjugated butadiene, the conjugated pentadienes, etc. Particularly valuable copolymers are those of the methylpentadienes with minor amounts of isoprene (2-methyl-1,3-butadiene) and with minor amounts of 1,3-butadiene. The methylpentadienes can be polymerized with minor amounts of compounds containing in the molecule a polymerizable unsaturated carbon-to-carbon linkage which is unconjugated with respect to carbon, i. e. which is not in conjugated relationship with any other polymerizable unsaturated carbon-to-carbon linkage. Examples of polymerizable non-conjugated unsaturated compounds are styrene, alpha methyl styrene, acrylonitrile, methacrylonitrile, vinyl chloride, vinyl acetate, acrylates, as ethyl acrylate, methacrylates, methyl vinyl ketone, isobutylene, etc., together with their homologues, analogues, and suitable substitution products. One or more polymerizable conjugated aliphatic dienes can be used together with one or more polymerizable non-conjugated unsaturated compounds. The advantages of the invention are most apparent in polymerization reactions in which the total amount of polymerizable unsaturated compounds other than the particular methylpentadienes with which the invention is concerned is not more than about 30% by weight, preferably not more than about 20% by weight, of the methylpentadiene or mixture of methylpentadienes used. Satisfactory copolymers of 2-methyl-1,3-pentadiene and 4-methyl-1,3-pentadiene with such minor proportions of other polymerizable unsaturated compounds have not previously been capable of production on a commercially feasible scale. It is to be understood, however, that the technique of the present invention can be used in the production of co-polymers of 2-methyl-1,3-pentadiene and 4-methyl-1,3-pentadiene with more than 30% by weight of other polymerizable unsaturated compounds.

The hexadiene-containing charge may be polymerized in bulk in the substantial absence of diluents. The reaction is, however, more easily controlled and the production more easily handled if a homogenizing agent is present during the polymerization. Diluent liquids employed may be solvents for the reactants and sometimes also for the products. In general it is preferred to use diluents which are substantially non-solvents for both reactants and products, the reaction mixture being an emulsion or an impermanent suspension. The dispersing medium employed will depend to some degree upon the particular catalyst used and should be non-reactive with the polymerizable compounds or products present in the system. Water is generally found to be a dispersing medium. Other dispersing media may, however, be used. The dispersing medium may furthermore consist of a mixture of non-solvents, or a mixture of one or more non-solvents with one or more solvents.

The suspension or dispersion is ordinarily produced by agitation of the reactants with the dispersing medium. Agitation is preferably maintained throughout the polymerization. Emulsifying agents such as, for example, soaps, sodium oleate, aleic acid, stearic acids, etc., cetyl p-dimethylaminobenzoate, sodium lauryl sulfate, other salt derivatives from bases with long aliphatic chains and inorganic or organic acids, salts derived from high molecular weight acids and inorganic bases etc. may be present. Protective colloids, such as glue, gelatine, methyl cellulose, poly-vinyl alcohol, albumen, blood fibrine, starch, and the like may be employed instead of, or in addition to, the emulsifying agents. These latter substances and others sometimes act as dispersing or granulating agents, as distinguished from emulsifying agents, promoting the production and maintenance of a dispersion which is not, however, a permanent emulsion and settles out upon cessation of agitation. The process of the invention may be executed with the reactants in suspension in the absence of emulsifying agents, dispersing agents, granulating agents and protective colloids. Such suspensions have been called "zero emulsions" and the process is known as "pearl polymerization."

The reaction mixture may also contain plasticizers, anti-oxidants, inhibitors, lubricants, dyes, pigments, fillers and the like, the particular nature of which is often dependent upon particular conditions employed and upon the subsequent treatment of the reaction mixture after the polymerization and upon the characteristics of the particular product desired. The use of promoters or regulators may be resorted to.

The polymerization of the hexadiene-containing charge is conducted in the broad range of, for example, from about 50° C. to about 150° C. Temperatures above about 80° C. are however preferred. A particularly preferred temperature range comprises a temperature of from about 80° C. to about 120° C. Higher temperatures within the prescribed range, and even somewhat higher than 150° C., are satisfactorily resorted to, particularly when effecting the polymerization under continuous operating conditions.

The reaction can be conducted in a continuous or batchwise manner. Subatmospheric, atmospheric or superatmospheric pressures up to for example about 150 pounds and higher may be used. The reaction may be carried out in the substantial absence of free oxygen-containing atmosphere. To this effect the reaction mixture may be blanketed with nitrogen, carbon dioxide or other non-oxygen containing gaseous fluid during at least a part of the polymerization reaction.

The time required for the reaction is dependent to some degree upon many factors including the nature and properties of the ingredients of the reaction mixture, the conditions under which the reaction is conducted and the degree of completion desired. In the temperature range of from about 80° C. to about 120° C. a conversion of from about 75% to about 95% of monomer to polymer is obtained in a period of from about 5 hours to about 25 hours. Shorter or longer periods of time may however be resorted to within the scope of the invention.

The organic hydroperoxide catalyst is generally added to the reaction mixture in amounts ranging from about 0.1% by weight to about 5% by weight, and preferably from about 0.5% to about 1.5% by weight of monomers charged. The use of higher or lower amounts of the catalysts may however be resorted to. The catalyst may be added in small amounts intermittently or continuously during the course of the polymerization reaction. It has been found that substantial advantages are thereby obtained. Among the advantages encountered is a substantial saving in catalyst due to the lesser amount of catalyst employed. Thus in the polymerization of a mixture of methylpentadienes consisting of a major amount of 2-methyl-1,3-pentadiene and a lesser amount of 4-methyl-1,3-pentadiene, when all the catalyst (tertiary butyl hydroperoxide) was added at the start of the polymerization, a concentration of about two parts per hundred of monomer was required to carry the reaction to a high yield in sixteen hours of operation at a temperature of about 110° C. When, on the other hand, the catalyst (tertiary butyl hydroperoxide) was added continuously or in increments during the course of the reaction, conducted under otherwise substantially identical conditions, an equal or even higher rate of polymerization was obtained with not more than 1.5 parts of catalyst.

Although but one compound of the above defined class of catalysts is generally employed, more than one organic hydroperoxide compound may be added as the catalyst. The catalysts are added to the reactants as such or as a suspension, or dissolved in a suitable solvent.

It is to be pointed out that a signal advantage of the use of the organic hydroperoxide catalysts resides in the greater permissible range of latitude in hydrogen ion concentration than is possible with other catalysts capable of being utilized in this temperature range, such as, for example, diazoaminobenzene. Maintenance of a desired hydrogen ion concentration may be obtained by the controlled addition of suitable hydrogen ion adjusters, or buffers, such as for example, sodium hydroxide phosphates, carbonates, acetals, etc. The particular range of hydrogen ion concentration to be preferred is dependent upon many factors including the nature and properties of the reaction mixture, operating conditions, etc. When utilizing soap as the dispersing agent within the prescribed conditions of operation the hydrogen ion concentration is preferably maintained within a range of from about 10 to about 11.5 in terms of pH values.

It is to be understood that instead of effecting the polymerization in aqueous emulsion, polymerization of the participating compounds may be brought about by simply heating and further that the polymerization reaction may involve the use of partially polymerized reactant or reactants as primary materials.

The following examples are illustrative of the production of valuable synthetic elastomers or synthetic rubbers in accordance with the process of the invention.

Example I

In each of the following operations, Nos. 1 through 6 respectively, 100 parts of methylpentadiene (consisting of a major proportion of 2-methyl-1,3-pentadiene and a minor proportion of 4-methyl-1,3-pentadiene) containing tertiary butyl hydroperoxide as catalyst, was emulsified in 180 parts by weight of water. Oleic acid in the amount indicated in parts by weight in the following table was added to the emulsion as an emulsifying agent. A protective colloid consisting of polymerized sodium salts of alkyl naphthalene sulfonic acids, was added in an amount equal to one part by weight. The emulsions thus obtained were maintained at the respective polymerizing temperatures and for the periods of time indicated in the table below. The amounts of catalyst, emulsifying agent, in parts by weight, as well as the yield obtained in per cent by weight of methylpentadiene subjected to the polymerization treatment in each of the respective operations, are shown in the following table. The pH of the emulsion was maintained in the range of from 10.2 to 11.5 by the addition of aqueous sodium hydroxide to the reaction mixture during the operations. After the polymerization the emulsions were broken by the addition thereto of an electrolyte. The precipitated polymer was then washed, dried and sheeted in the conventional manner.

| Operation No. | Catalyst added, Parts by weight | Temperature, °C. | Oleic Acid added, Parts by weight | Polymerization Time in hours | Percent Yield | Mooney Plasticity at 60° C |
|---|---|---|---|---|---|---|
| 1 | 1.5 | 100 | 6.8 | 26.5 | 73 | 25 |
| 2 | 2.0 | 100 | 4.6 | 30 | 81.5 | 14 |
| 3 | 2.0 | 100 / 110 | 4.6 | {5 / 12} | 17 | 80.8 | 9 |
| 4 | 2.0 | 110 | 4.6 | 15 | 83.8 | 11 |
| 5 | 2.0 | 110 | 4.6 | 16 | 84.4 | 33 |
| 6 | 1.5 | 110 | 4.6 | 17 | 81.4 | 32 |

Example II

In the following operations Nos. 7 through 9, respectively, 100 parts of monomer, consisting of 80% by weight of methylpentadiene and 20% by weight of butadiene, was emulsified in 180 parts by weight of water. Tertiary butyl hydroperoxide was added as catalyst in the amounts indicated in the following table. 4.6 parts by weight of oleic acid, an emulsifying agent, and one part by weight of protective colloid consisting of polymerized sodium salts of alkyl naphthalene sulfonic acids were also added. The emulsions thus obtained were maintained at the respective polymerizing temperatures and for the periods of time indicated in the table below. The amounts of catalyst, in parts by weight as well as the yield in percent by weight obtained in each of the respective operations are shown in the following table. The pH of the emulsion was maintained in the range of from 10.2 to 11.5. After the polymerization the emulsions were broken by the addition of an electrolyte. The precipitated copolymer was then washed, dried and sheeted.

| Operation No. | Catalyst added, Parts by weight | Temperature, °C. | Polymerization Time in hours | Per Cent Yield | Mooney Plasticity at 60° C. |
|---|---|---|---|---|---|
| 7 | 0.6 | 100 | 8 | 79.4 | 42 |
| 8 | 2.0 | 90 | 16 | 57.1 | |
| 9 | 0.56 | 100 | 13.5 | 78.0 | 54 |

The hydroperoxide catalyzed polymers and copolymers thus obtained were found to be light in color. As compared with other synthetic rubbers, the methylpentadiene polymers and copolymers appear to possess considerable advantage in their better milling quality, tack and higher plasticity. They are soluble in most solvents, such as, for example, in hexane, pentane, isooctane, gasoline, "rubber solvent," cyclohexane, methylcyclohexane, chloroform, ethylene dichloride, trichloroethane, trichloroethylene, monochlorobenzene, monochlorotoluene, dichlorobenzene, benzene, toluene, benzyl alcohol, dibenzyl ether, phenylethyl ether, dioxane butyl acetate, etc.

They possess an appreciably flatter curing rate and exhibit little stiffening on over-cure. The tackiness of the elastomers of the process of the invention approaches that of natural rubber. They furthermore display a lower average temperature rise in hysteresis tests and have excellent aging properties. Modulus and elongations are unusually well sustained and tear and cut-growth resistance are virtually unimpaired, even after 21 days of aging at 80° C.

When diluents are used the polymer may be precipitated or coagulated, if necessary, by known or special methods, separated from the remainder of the reaction mixture by filtration, centrifuging or the like, washed and dried. The polymer may be further purified by treatment, such as for example by boiling with dilute caustic, which removes fatty acids and other contaminants which may be present. The polymer produced by aqueous emulsion methods comprises a synthetic latex which may be used directly in many applications or treated further, as by stripping, concentrating, and compounding, to increase its usefulness for certain applications. The dispersion medium may be partly or wholly replaced by another medium. Synthetic latex may also be produced by dispersing the coagulated polymer.

The polymers obtained by the process of the invention may be compounded with modifying substances such as those used with natural rubber. Compounding can be done in a Banbury mixer or on a roll mill, the desired substances being added, usually one at a time, as fast as efficient blending with the stock and the maintenance of operable working consistency permit.

Representative examples of plasticizers which may be used are: wood rosin, gum rosin, ester gum, alkyd resins, phenol-aldehyde resins, shellac, dibutyl sebacate, dibutyl phthalate, dicapryl phthtlate, dioctyl phthalate, coal tar, cumarone resins, tricresyl phosphate, chlorinated tricresyl phosphate, alkoxy alkyl phosphates, tributoxy ethyl phosphate, dibenzyl ether, triacetin, stearic acid, lauric acid, aromatic high molecular weight petroleum fractions, etc. Other plasticizers are suitable. Chemical plasticizers may be used.

Tackifiers may be present. Among the common tackifiers are higher unsaturated cyclic ketones and hydrogenation products thereof, resins produced by reacting higher ketones with aldehydes, and the unsaturated hydrocarbon product obtained from lubricating oil acid sludge known commercially by the trade name "Naftolen."

Antioxidants may be present. The most common antioxidant is phenyl beta-naphthyl amine. Other antioxidants include para-hydroxy diphenyl, hydroquinone, para-amino phenol, para,-para'-diamino diphenylmethane, 2,4-n-toluylene diamine, diaphenylamine, ortho-ditolylamine, para-ditolylamine, phenyl alpha-naphthyl amine, phenyl beta-naphthyl nitrosoamine, sym-di-beta-naphthyl para-phenylene diamine, diphenyl diamino ethane and 2,4-diaminodiphenylamine.

Carbon black and other fillers and pigments may be present. In tire manufacture channel black is the preferred reinforcing pigment. Semi-reinforcing black, thermatomic black, acetylene black and the like may be used. Mineral pigments such as clay, calcium silicate, iron oxide, chromium oxide, zinc oxide, titanium dioxide, etc. may be used.

In the production of vulcanizable compositions, one or more vulcanizing agents are usually added. Sulfur is the preferred vulcanizing agent. Other agents used, generally with less success, are sulfur-containing compounds, such as sulfur dioxide, hydrogen sulfide, thiuram disulfides, tetrasulfides and sulfur thiocyanate; oxygen and oxygen-yielding compounds, such as ozone, organic and inorganic peroxides; selenium, halogens and halogen-containing compounds, and, nitrogen-containing compounds, such as the nitrobenzenes.

Vulcanization accelerators may be present. Illustrative examples of accelerators are tetramethyl thiuram disulfide, zinc dibutyl dithiocarbamate, tetramethyl triuram monosulfide, dipentamethylene thiuram tetrasulfide, mercapto benzo thiazole, hexamethylene-tetramine, aldehyde-ammonia, diphenylguanidine, diphenylthiourea, benzo thiazyl disulfide, piperidinium pentamethylene-dithiacorbamate, di-o-tolylguinidine, triphenylguanidine and lead dimethyldithio carbamate.

In addition to, or instead of, the modifiers already mentioned the compositions may contain dyes, stabilizers, lubricants, tackifiers, thickening agents, and the like. They may be mixed with plastic substances of many kinds, many of the plastics acting as plasticizers. Examples of plastic modifiers are natural resins, thermosetting condensation-type synthetic resins such as phenolaldehyde, urea-aldehyde and many alkyd resins, resins produced by the polymerization and co-polymerization of unsaturated compounds such as those listed hereinabove, protein plastics, cellulose derivatives and the like. In some cases, the modifying plastics may be produced in situ in the presence of the polymethyl pentadienes. These and other modifiers may often be present during the polymerization reaction.

The polymers obtained in accordance with the invention may be blended with natural, synthetic or reclaimed rubber. Small amounts of latex or crude rubber of Hevea or the like increase the adhesiveness of the compositions. Synthetic rubber modifiers include polymers of 1,3-butadiene, isoprene, piperylene, 2,3-dimethyl-1,3-butadiene, chloroprene, the other 1,3-dienes, olefins such as isobutylene, co-polymers of 1,3-dienes with styrene, acrylonitrile and the like, co-polymers of isobutylene with a small amount of butadiene, high molecular weight polyesters, polyvinyl halides, olefin polysulfides and the like.

The polyhexadiene containing polymers and compounded compositions containing them may be subjected to numerous shaping operations. Sheets may be produced by the use of roll mills such as calenders or, less usually by casting from solutions. Sheets, rods, tubes nad coatings may be produced by continuous or discontinuous extrusion. Molded articles may be produced by operations using open or closed molds. The compositions may be applied to fibrous material such as fabric by calendering or by impregnation with a solution or emulsion.

Compositions containing a vulcanizing agent may be vulcanized at temperatures used in the vulcanization of natural rubber and of other elastomers, e. g. 50° C. to 200° C.

Example III 100 parts by weight of the synthetic rubber-like product obtained in operation No. 1 of Example I was compounded with carbon black 50 parts, a refined coal tar oil softening agent 5 parts, mercaptobenzothiazole 1.5 parts, zinc oxide 5 parts, sulfur 2 parts, and tetramethyl thiuram disulfide 0.4 parts. (All proportions indicated are in parts by weight.) Three separate portions of the composition thus obtained were heated at 145° C. for the periods of time indicated in the following table. The characteristics of the vulcanizates thus obtained were determined and are given in the table:

| Time of heating in minutes | Tensile strength pounds per sq. in. | Percent Elongation | Modulus at 300% elongation | Permanent set, percent |
|---|---|---|---|---|
| 60 | 1,730 | 710 | 440 | 41 |
| 90 | 1,680 | 670 | 500 | 32 |
| 120 | 1,620 | 720 | 460 | 29 |

The synthetic elastomers of the invention may be used for most of the purposes for which other synthetic and natural elastomers are used. They are valuable in the production of ballon coverings, umbrellas, raincoats, tents, table covers, shower curtains, garment bags, electrical insulation, friction tape, hose for the handling of aqueous mixtures, paints, etc., self-sealing fuel tanks, gaskets, belts for conveying and for the transmission of power, vibration dampeners, printers' rolls, printers' blankets, engraving plates, shoe soles and heels, aprons, gloves, gas masks, clothing resistant to the penetration of poisonous gases, tire tubes, tire casings and adhesives. They may be used as plasticizers and tackifiers.

The synthetic elastomers or synthetic rubbers produced in accordance with the process of the invention because of their non-toxic nature are, however, of particular value in the production of, or incorporation into, rubberized garments, rubber gloves, gas masks, and packaging materials for foods, drugs, and other products destined for consumption or otherwise coming into contact with the human body.

The properties of the synthetic elastomers may be modified by chemical or physical after-treatment in accordance with known or special methods.

We claim as our invention:

1. A process for the production of light colored, non-toxic rubber-like materials which comprises heating in the form of an aqueous emulsion a polymerizable monomeric charge consisting of at least one branch-chain 1,3-hexadiene having a methyl group directly attached to a penultimate carbon atom of a straight chain of five carbon atoms at a temperature of from 80° C. to 120° C. in the presence of from 0.1% to 5.0% by weight of tertiary butyl hydroperoxide.

2. A process for the production of light colored, non-toxic rubber-like materials which comprises heating in the form of an aqueous emulsion a polymerizable monomeric charge consisting of at least one branch-chain 1,3-hexadiene having a methyl group directly attached to a penultimate carbon atom of a straight chain of five carbon atoms at a temperature of from 80° C. to 150° C. in the presence of tertiary butyl hydroperoxide.

3. A process for the production of light colored, non-toxic rubber-like materials which comprises heating in the form of an aqueous emulsion a polymerizable monomeric charge consisting of at least one branch-chain 1,3-hexadiene having a methyl group directly attached to a penultimate carbon atom of a straight chain of five carbon atoms at a temperature of from 80° C. to 150° C. in the presence of tertiary amyl hydroperoxide.

4. A process for the production of light colored, non-toxic rubber-like materials which comprises heating in the form of an aqueous emulsion a polymerizable monomeric charge consisting of at least one branch-chain 1,3-hexadiene having a methyl group directly attached to a penultimate carbon atom of a straight chain of five carbon atoms at a temperature of from 80° C. to 150° C. in the presence of a tertiary alkyl hydroperoxide.

5. A process for polymerizing methylpentadienes which comprises heating in the form of an aqueous emulsion a polymerizable monomeric charge consisting of at least one branch-chain 1,3-hexadiene having a methyl group directly attached to a penultimate carbon atom of a straight chain of five carbon atoms at a temperature of from 50° C. to 150° C. in the presence of a tertiary alkyl hydroperoxide.

6. A process for polymerizing a branch-chain 1,3-hexadiene which comprises heating in the form of an aqueous emulsion, a polymerizable monomeric charge consisting of a branch-chain 1,3-hexadiene having a straight chain of five carbon atoms to the penultimate carbon atom of which is attached a methyl group at a temperature of from 80° C. to 150° C. in the presence of tertiary butyl hydroperoxide.

7. A process for polymerizing a branch-chain 1,3-hexadiene which comprises heating in the form of an aqueous emulsion, a polymerizable monomeric charge consisting of a branch-chain 1,3-hexadiene having a straight chain of five carbon atoms to the penultimate carbon atom of which is attached a methyl group at a temperature of from 80° C. to 150° C. in the presence of an alkyl hydroperoxide containing a tertiary aliphatic carbon atom directly connected to the hydroperoxy radical (—O—O—H).

8. A process for polymerizing a branch-chain 1,3-hexadiene which comprises heating in the form of an aqueous emulsion, a polymerizable monomeric charge consisting of a branch-chain 1,3-hexadiene having a straight chain of five carbon atoms to the penultimate carbon atom of which is attached a methyl group at a temperature of from 80° C. to 150° C. in the presence of an alykyl hydroperoxide.

9. A light colored, non-toxic co-polymer of 2-methyl-1,3-pentadiene and 4-methyl-1,3-pentadiene obtained by co-polymerizing in the form of an aqueous emulsion a mixture of said methylpentadienes at a temperature of from 80° C. to 150° C. in the presence of an alkyl hydroperoxide containing a tertiary aliphatic carbon atom directly connected to the hydroperoxide radical (—O—O—H).

10. A light colored, non-toxic polymer obtained by heating in the form of an aqueous emulsion a polymerizable monomeric charge consisting of at least one branch-chain 1,3-hexadiene having a methyl group directly attached to a penultimate carbon atom of a straight chain of five carbon atoms at a temperature of from 50° C. to 150° C. in the presence of a tertiary alkyl hydroperoxide.

EUGENE T. BISHOP.
ROBERT D. SULLIVAN.

(References on following page)

REFERENCES CITED

The following references are of record in the file of this patent:

UNITED STATES PATENTS

| Number | Name | Date |
|---|---|---|
| 1,294,662 | Holt | Feb. 18, 1919 |
| 2,142,980 | Huijser | Jan. 3, 1939 |
| 2,340,109 | D'Alelio | Jan. 25, 1944 |
| 2,367,805 | Semple | Jan. 23, 1945 |
| 2,391,817 | Blackburn | Dec. 25, 1945 |
| 2,394,406 | Schoenfeld | Feb. 5, 1946 |
| 2,409,996 | Roedel | Oct. 22, 1946 |

OTHER REFERENCES

Union Bay State Co., Chem. & Met: Oct. 1943, page 158.

Bachman & Goebel: J. Am. Chem. Cor., 64 787 to 790 (1942).